Oct. 30, 1928.

W. B. CLIFFORD

1,689,620

APPARATUS FOR PRODUCING BELLOWS FOLDS IN TUBING

Filed April 2, 1926

W. B. CLIFFORD 1,689,620

APPARATUS FOR PRODUCING BELLOWS FOLDS IN TUBING

Filed April 2, 1926   7 Sheets-Sheet 5

Fig. 5

Witness
Frederick S. Greenleaf

Inventor
Wallis B. Clifford
by his attorneys
Van Everen Fish Hildreth Plant

Oct. 30, 1928.

W. B. CLIFFORD

1,689,620

APPARATUS FOR PRODUCING BELLOWS FOLDS IN TUBING

Filed April 2, 1926

W. B. CLIFFORD 1,689,620

APPARATUS FOR PRODUCING BELLOWS FOLDS IN TUBING

Filed April 2, 1926     7 Sheets-Sheet 7

Witness
Frederick S. Greenleaf

Inventor
Walter B. Clifford
by his attorneys
Van Everen Fish & Holdsworth Carey

Patented Oct. 30, 1928.

1,689,620

UNITED STATES PATENT OFFICE.

WALTER B. CLIFFORD, OF FRAMINGHAM, MASSACHUSETTS, ASSIGNOR, BY MESNE ASSIGNMENTS, TO CLIFFORD MANUFACTURING CO., OF BOSTON, MASSACHUSETTS, A CORPORATION OF DELAWARE.

APPARATUS FOR PRODUCING BELLOWS FOLDS IN TUBING.

Application filed April 2, 1926. Serial No. 99,418.

The present invention relates to improvements in apparatus for the production of bellows folds in tubing.

This operation as practised commercially consists in a series of rolling operations which initially form broad, shallow grooves in the tubing and thereafter narrow and deepen these grooves until the desired form of fold is obtained. This operation is necessarily slow and tedious, imposes a considerable strain upon the wall of the tubing, and requires annealing of the tubing one or more times before the completion of the folds. Attempts have been made to form the bellows folds by enclosing the tubing within a series of spaced dies and exerting a fluid pressure from within to force the wall outwardly between the dies. In certain attempts the internal pressure has been relied on to force the wall outwardly and in other attempts the internal pressure is merely employed for the purpose of preventing collapsing of the wall which is forced outwardly through a pressure exerted in an endwise direction. Although in theory this method of forming the bellows folds is preferable to the commercial method of rolling the folds in a series of operations, nevertheless the practical difficulties incident to the production of bellows folds in this manner have heretofore precluded its adoption commercially.

The apparatus embodying the present invention is primarily intended for the production of bellows folds in accordance with the method disclosed and claimed in my copending application, Serial No. 741,688, filed October 4, 1924, although many features of the invention could be employed to great advantage in other and generally similar methods of forming bellows folds.

The various features of the present invention consist in certain novel features of construction, combinations and arrangements of parts all as hereinafter described in the accompanying specification and defined in the claims.

In the accompanying drawings illustrating the preferred form of the invention.

According to the present invention a previously prepared tube is first mounted in position within the forming mechanism. This tube, as disclosed more particularly in my previous application, is provided with one or more end members or heads which are locked against removal from the tube through the provision of integral end flanges formed by spinning or equivalent methods. These end members normally comprise hollow heads or short sleeves having inturned shoulders or faces engaging behind the annular flanges on the ends of the tubes and clamped thereagainst by complementary heads inserted within the hollow heads or sleeves in a manner to draw the shoulders against the back of the flanges. One of the complementary heads is provided with an opening for the insertion of fluid within the tube during the forming operation. The opposite set of heads seal the tube against leakage of fluid if the tube is normally open at both ends. If the tube is initially made with one end closed, the head is employed simply as a fitting and not for the purpose of sealing the tube. With this construction the interior of the tube is hermetically sealed, except for the provision of the opening through the head in one end. The tube thus fashioned is mounted between aligned heads which are then moved toward one another to engage the tube at opposite ends. One of the heads may be termed the fluid pressure head and is employed for conducting fluid pressure to the interior of the tube during the forming operation. This head is normally stationary during the operation. The opposing head is employed for contracting the overall length of the tube after the completion of the internal fluid pressure. Cooperating with the heads are a series of spaced separable dies within which the tube is initially mounted. These spaced dies each consist of two portions hinged together in such a manner that upon closure the tube in its initial form is closely encircled and prevented from expanding throughout the annular area encompassed by the die. The two portions of each die after closure upon the tube are locked together and are accurately spaced with relation to one another and to the length of the tube in order to provide for an accurate spacing of the areas of engagement by the several die members. While thus held in this position an internal fluid pressure is applied to the tube through the fluid passage at one end, this pressure being sufficient to maintain the walls of the tube against collapse during the subsequent portion of the forming operation. This internal pressure obviously varies with the character of the tubing, its diameter, the thickness of the wall, and the spacing of the dies. Subsequent to the application of the internal pressure and while this pressure is maintained, the spacer members are withdrawn from between the dies, thereafter permitting a movement of the dies toward one another and an endwise pressure is applied to the tube through the movable head. Upon the application of this endwise pressure while still maintaining the desired internal pressure, the wall of the tube rolls up into a series of folds between the dies. As this occurs, the overall length of the tube is foreshortened and the dies moved toward one another until the formation of the bellows folds is completed. The application of the initial internal pressure ordinarily expands the tube sufficiently to cause the dies to grip the wall of the tube with a sufficient force to prevent displacement of the dies relative to one another. Thereafter the movement of the dies is accomplished simply and solely through engagement with the wall of the tube as it is contracted. During the contraction of the tube in the formation of the bellows folds the dies must be maintained in planes normal to the axis of the tubing and parallel to one another. At the same time the dies must be entirely free to move with the tube as it is contracted in length. If the dies are not so free to move they will tilt with respect to one another and distort the finished folds. On the other hand, if the dies are compelled to move in unison upon contraction of the tube through the application of a force other than that exerted by the tube itself, interference is caused with the free formation of the bellows which may well result in spoiling the tube. At the completion of the operation the tube is freed at the ends, the individual dies are separated exposing the tube therewithin which is then removed from one-half of the dies in any suitable manner as with the specially designed fork or tool illustrated.

Although in actual practice it is deemed preferable to maintain the spacer members in position between the dies until after the application of the desired internal pressure, nevertheless it should be understood that the purpose of these spacer members is merely to insure an accurate initial spacing of the dies, and these may be removed prior to the application of the internal fluid pressure if care is maintained to avoid subsequent displacement of the dies with relation to one another in the tube.

Figure 1:
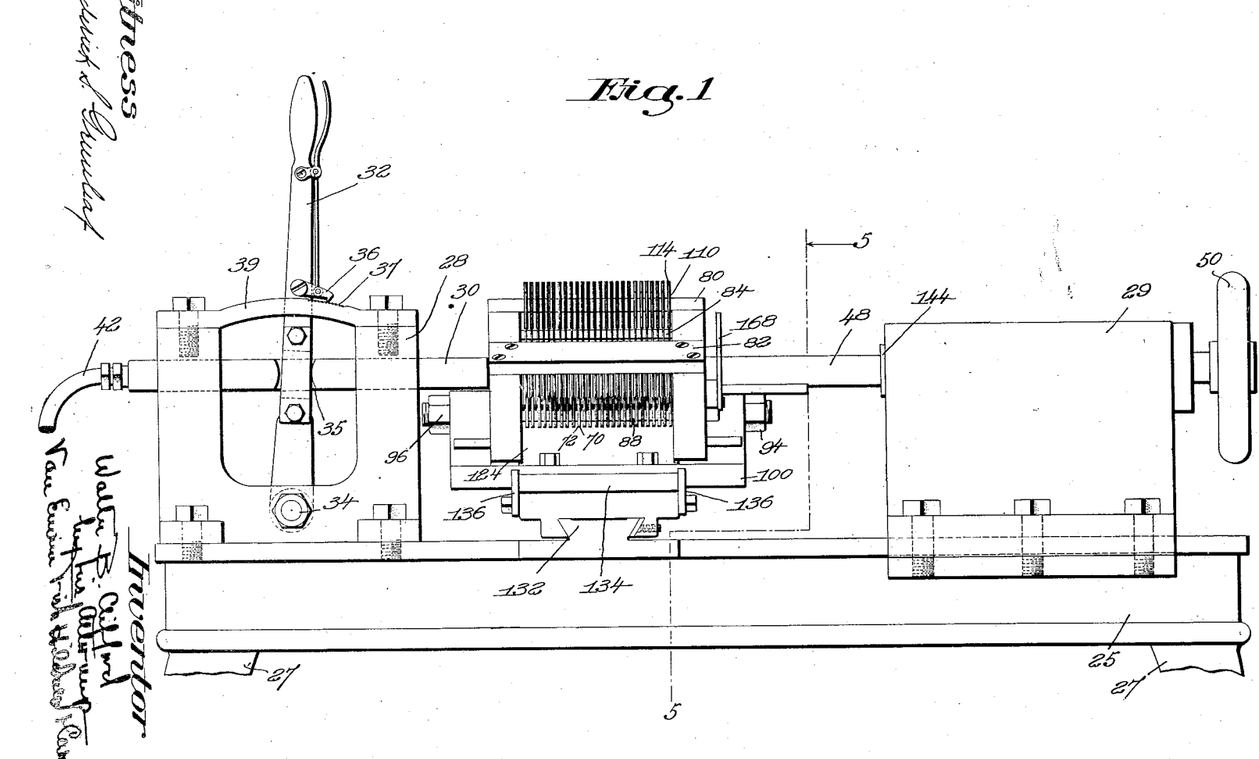
Fig. 1 represents a side elevation of a machine embodying the features of the invention.
Figure 2:
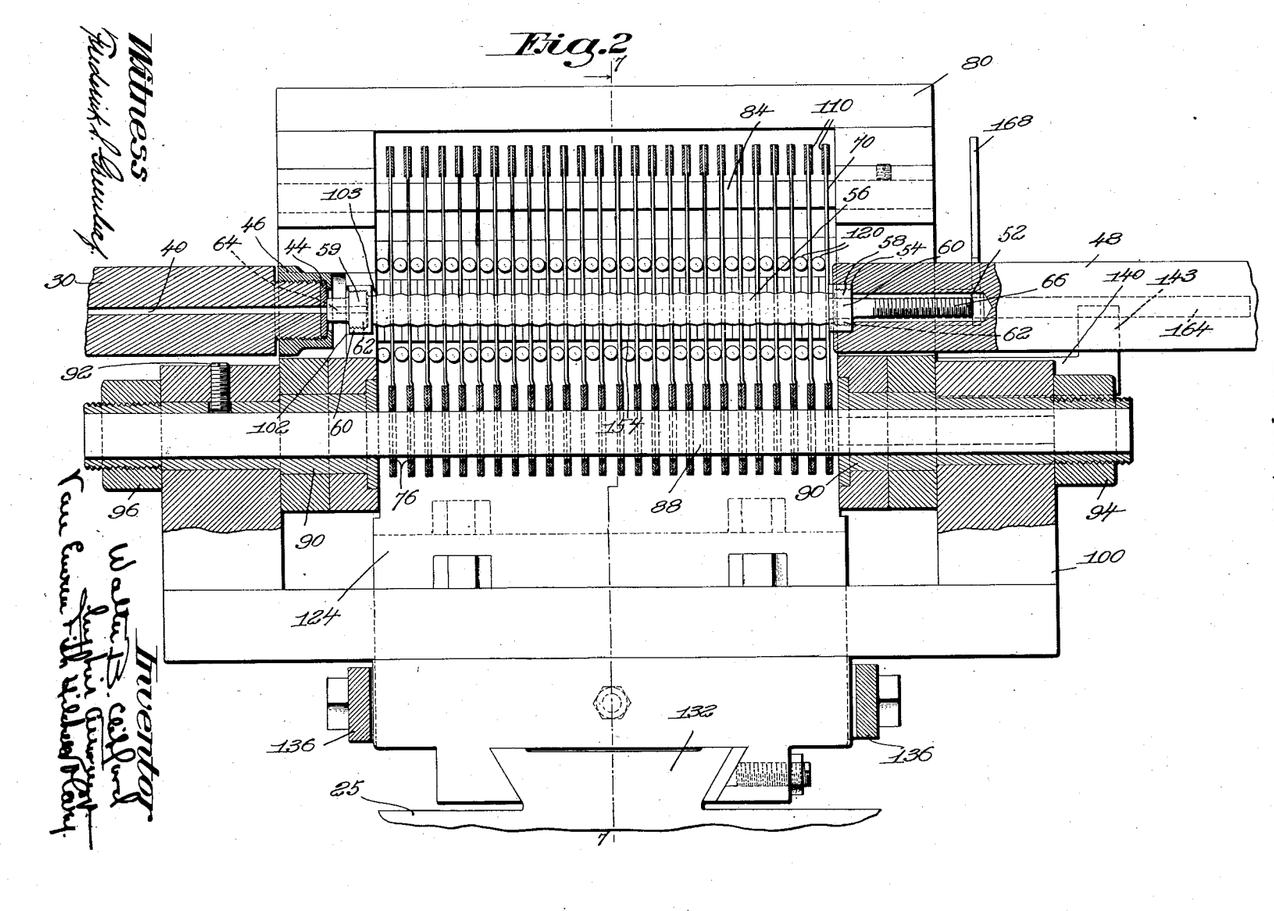
Fig. 2 is an elevation partly in section of the forming mechanism at the commencement of the forming operation, taken on the line 2—2 of Fig. 7.
Figure 5:
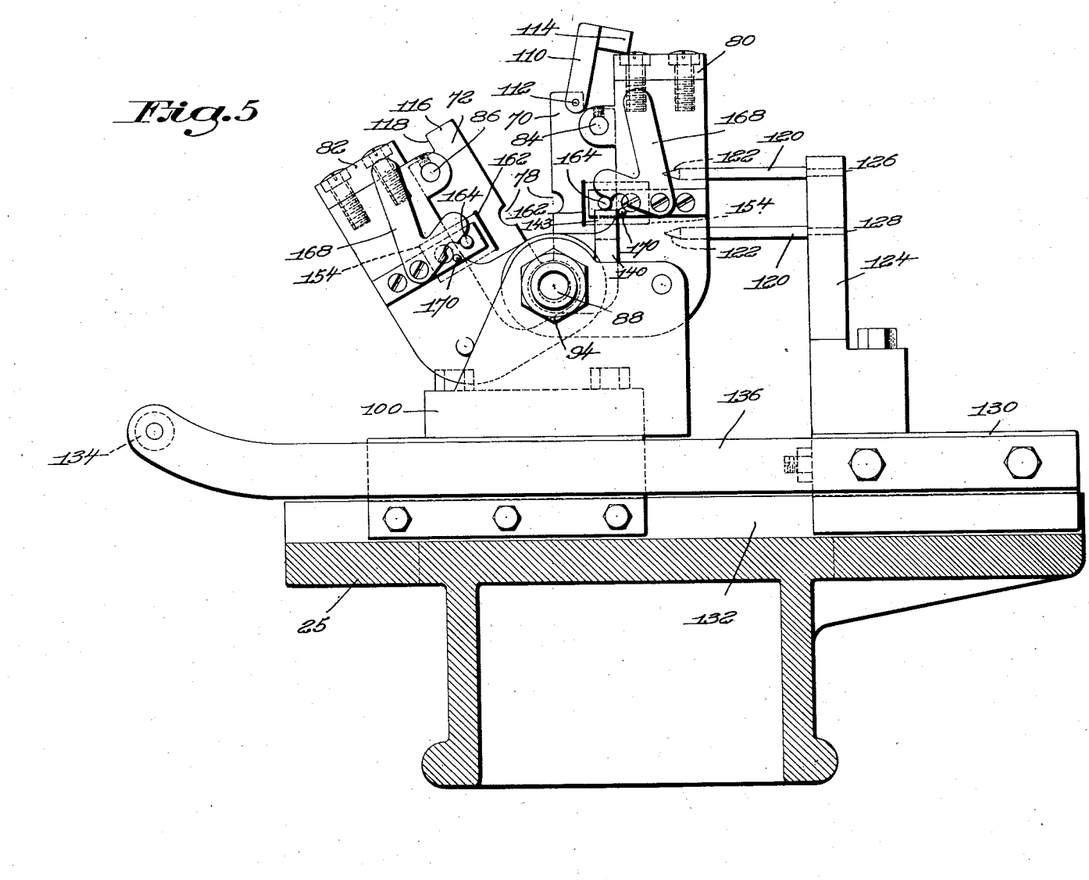
Fig. 5 is an end elevation of the forming mechanism taken on the line 5—5 of Fig. 1 and illustrating the mechanism in position preparatory to the reception of a tube.
Figures 6, 11:
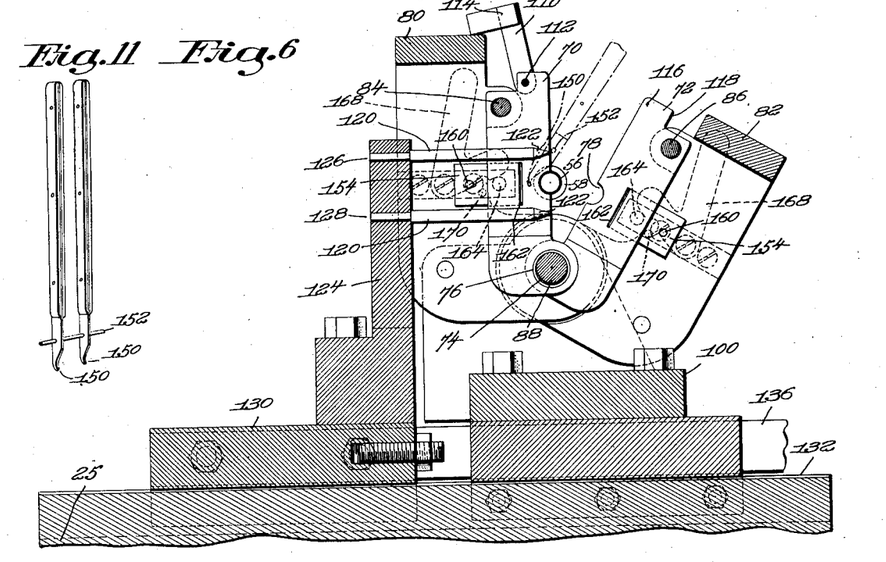
Fig. 6 is a longitudinal section of the forming mechanism illustrating the dies in open position preparatory to the reception of a tube to be formed.
Fig. 11 is a detail illustrating the tool for removing the finished tube after its completion in the forming mechanism.
Figure 7:
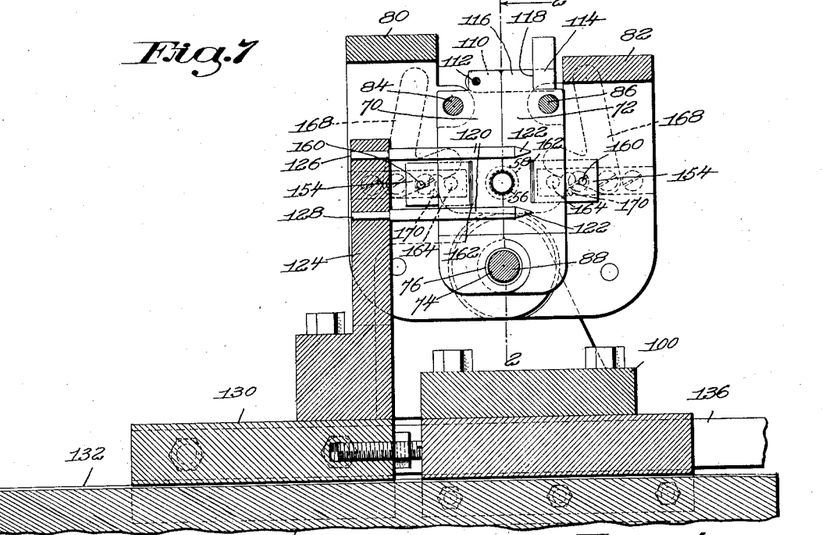
Fig. 7 is a similar section on the line 7—7 of Fig. 2 with the dies closed and locked in position about a tube and the spacer members inserted therebetween.
Figure 8:
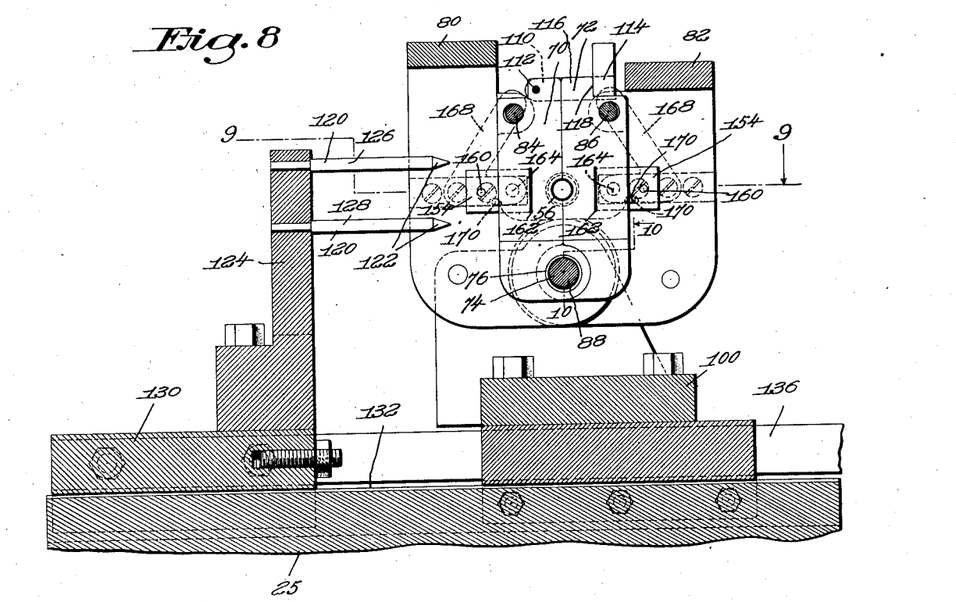
Fig. 8 is a similar section on the line 8—8 of Fig. 3 illustrating the dies at the completion of the forming operation and preparatory to opening for the removal of the finished tube.
Figure 10:
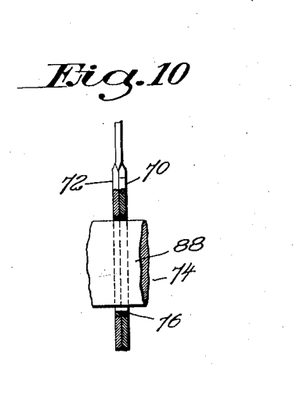
Fig. 10 is a detail illustrating a section on the line 10—10 of Fig. 8, illustrating the method of pivotally connecting the two halves of the die to one another.

As indicated more particularly in the illustrated embodiment of the invention, the machine comprises a bed 25 which may be supported upon legs indicated at 27. The bed, as indicated in Fig. 1, is of substantial length and is provided at opposite ends with stationary heads 28 and 29, respectively The stationary head 28 carries a fluid pressure head 30 which is slidingly supported in the head 28, as indicated, and has provision for a limited longitudinal movement by virtue of the operating lever 32 pivoted at 34 and engaging with the head 30 at 35. The operating lever may be locked in given position by a latch 36 which works over a toothed track 37 formed upon a bar 39 secured to the head 28. The pressure head is provided with a fluid passage, indicated at 40 in Fig. 2 and communicating at the far end with a flexible connection 42. The operating end of the head may be provided with a flat packing disk 44 having a passage aligned with the passage 40 and retained in position by an external sleeve 46, all as shown in Fig. 2. The purpose of this construction is to maintain a liquid seal between the passage 40 and the end of the tube, as will be more fully described hereinafter. The stationary head 29 is provided with a movable ram 48 sliding within the head and operated by a hand wheel 50 through interconnected mechanism (not shown) such as is common for operating the tail stock of a lathe or similar piece of apparatus. The ram 48 is provided with an elongated recess 52 for the reception of one of the end members on the tube assembly having an enlarged bore 54 at its forward end to closely encompass and engage the end fitting on the tube. As indicated more particularly in Fig. 2, the tube assembly consists of the tube 56 to be formed having oppositely disposed end members 58 and 59. Each of these end members comprises a similar cup-shaped sleeve 60 engaged and clamped to the upturned end of the tube by an internal head 62. The head in engagement with the pressure end of the apparatus is provided with a liquid opening 64 extending therethrough for the introduction of fluid within the tube, and the head at the opposite end is intended to seal the tube and may be provided with a threaded stem 66 which projects into the recess 52, as indicated. Upon the insertion of the tube within the apparatus the heads are moved toward one another to engage the ends of the tube in the manner shown and seal the interior, except through the provision of the intercommunicating fluid passages. The tube while supported in alignment with the oppositely disposed heads is engaged by one-half of a series of spaced dies, indicated more particularly in Figs. 2 and 6. Each of these dies consists of complementary portions 70 and 72 which are hinged at 74, as shown more particularly in Figs. 6 and 10. The complementary portions of the dies are relatively thin sheet metal members connected at the hinge point by a bushing 76. Above the hinge point the dies are offset toward one another an amount equal to approximately half the thickness in order to cause the meeting edges of the dies to align with one another when the complementary portions are in closed position. Each complementary portion is provided with a semi-circular recess 78, the two recesses combining to form a completed orifice closely encompassing the outer diameter of the tube when the dies are closed. The series of die members which collectively engage the length of the tube throughout spaced intervals are mounted in a die head having two portions 80 and 82 hinged at 74, each part of the die head carrying one half of the entire series of die members. The die heads, as indicated more particularly in Figs. 2, 3 and 6 to 8, inclusive, are provided with longitudinal rods 84 and 86, the rod 84 supporting and forming a slide bearing for the upper ends of the die portions 70, the rod 86 forming a similar bearing for the die portions 72. A third rod 88 forms the hinge for the two portions of the die heads 80 and 82 and a bearing for the bushings 76 which constitute the hinges for the individual die members. It will be evident upon an inspection of Figs. 6 to 8, inclusive, and 10 that the guide rods 84 and 86 engage the die portions 70 and 72 only throughout the inner portion of the openings in the die portions, and the lower rod 88 engages only with the upper portion of the bushing 76. With this construction the individual die members when closed are rigidly aligned with one another and with the encompassed tube, but are free to slide upon the guide rods during the contraction of the tube without cramping or binding. As indicated more particularly in Fig. 3, the lower guide rod 88 for supporting the hinge of the die members is provided at opposite ends with sleeve bushings 90 upon which the two halves 80 and 82 of the head are supported at opposite ends. The rod is normally retained in position by a set screw 92 which also prevents turning movement of the sleeve and may be withdrawn by loosening the screw and removing the check nuts 94 and 96 at opposite ends. With this construction, removal of the rod 88 together with the upper rods 84 and 86 permits removal and replacement of the individual die members without dismantling the two portions 80 and 82 of the head which remain aligned with one another through the provision of the bushings 90 which are supported directly in a main carrier 100, which in turn is mounted upon the bed 25 of the machine, as indicated in Fig. 1. The opposite halves 80 and 82 of the separable die head adjacent the pressure end of the apparatus are provided with complementary recessed portions, as indicated more particularly in Figs. 2 and 4, which form a recess for the reception of the pressure head and the pressure end of the tube when the die head is closed. As indicated in these figures, closing of the die head provides a recess 102 closely encompassing the end fitting 59 with a circular inwardly extending flange 103 which engages behind the head and resists the sealing thrust of the pressure head 30. By virtue of this form of construction the end thrust, due to sealing pressure, is sustained entirely by the end fitting or head and is not transmitted to the relatively thin wall of the tube itself. Accordingly a sufficient pressure may be exerted against the end of the fitting to adequately seal the high pressures employed without liability of excessive leakage or damage to the tube. Obviously the open end of the tube itself is sealed by the clamping effect of the two complementary portions of the end fitting, and is not dependent upon the pressure exerted through the fluid pressure head. After the tube assembly has been inserted within the apparatus, as previously indicated and as shown in Fig. 6, the two halves of the die head are closed and the complementary portions of the individual die members rigidly locked together through a series of locking members 110. Each locking member comprises an arm pivoted at 112 to the portion 70 of the die member and provided with a forked locking end 114 which embraces the extended upper end 116 of the die portion 72 and engages behind the shoulder 118 formed thereon, as indicated more particularly in Figs. 7 and 8. These individual die locks sustain the pressure transmitted to the die portions 70 and 72 during the formation of the bellows folds and eliminate pressure from this source which would otherwise be transmitted to the guide rods 84 and 86. After the closure and locking of the individual die members about the tube, as indicated more particularly in Fig. 7, an accurate spacing of the die members with relation to one another and the length of the tube is insured by the insertion between the die members of a series of spacer fingers. The spacer fingers are indicated at 120 and consist of a series of uniformly spaced elongated members having tapered end portions 122. The spacer members extend transversely from an upstanding head 124 and are mounted in upper and lower rows indicated respectively at 126 and 128. As shown more particularly in Figs. 2 and 8, the spacer fingers extend between each two adjacent die members above and below the encompassed tube and in reasonably close proximity thereto. The length of the fingers is such that when in operative position they extend beyond the tube and insure parallelism of the die members and positioning of the members in planes normal to the axis of the tube. The two series of spacer members, as indicated, are mounted on an upstanding head 124 which is carried by a sliding head 130 supported upon transverse ways 132 formed on the machine bed. The head carrying the spacer members is operated by a handle 134 shown in Figs. 1 and 5 at the front of the machine and connected to the sliding head 130 by oppositely disposed arms 136. With this construction the spacer members as a unit may be conveniently moved to and from the operative position. In the usual operation of the machine the tube assembly is inserted within the dies, the heads closed upon the end fittings, the hinged head carrying the die members closed, the individual dies locked in closed position, and the spacer members inserted to insure accurate and uniform spacing of the die members with relation to one another. Thereafter fluid pressure is admitted to the interior of the tube through the fluid passage 40. This fluid pressure may be generated either by a power or hand pump provided with an automatic relief valve to prevent the pressure within the tube from exceeding predetermined limits. This mechanism which may be of usual form and which does not form an integral part of the forming apparatus is not illustrated herein. The pressure to which the interior of the tube is subjected varies according to circumstances but can readily be determined for any given size of tube on spacing of die members. In the illustrated form of the invention which is intended for operation upon phosphor bronze tubing of ⅜" outside diameter and having a wall thickness of .006 the tube is initially subjected to an internal pressure of between 1100 and 1200 pounds, which is maintained during the formation of the bellows folds. For the same dimensions of tubing in brass having a composition of 80 per cent copper and 20 per cent zinc, the sustaining pressure is somewhat lower. In actual practice it is found convenient to apply the internal pressure before removal of the spacer members from between the dies. This causes the tube to be slightly expanded, as indicated in exaggerated form in Fig. 2, locking the dies in uniformly spaced position throughout the length of the tube. Thereafter the spacer fingers are withdrawn and the tube subjected to an endwise contracting pressure while maintaining the internal pressure substantially at the initial point. The endwise contracting pressure upon the tube is exerted by rotating the hand wheel 50 which advances the ram 48 from the position shown in Fig. 2 to approximately the position shown in Figs. 3 and 4. The movement of the ram at the completion of the bellows is limited by a stop member 140 secured to the bed 100 at 142 and having an upturned end 143 which engages with the enlarged hub 144 of the ram upon completion of the stroke, as indicated more particularly in Figs. 3 and 4. Provision of this stop member serves to accurately gauge the operative travel of the ram and prevent crushing or buckling of the relatively thin die plates. At the completion of the operation, the heads at opposite ends of the tube assembly are withdrawn sufficiently to free the assembly and the heads 80 and 82 are thereafter opened into the relative position shown in Fig. 5 This leaves the completed tube assembly engaged by one-half of the die plates in somewhat the fashion shown in Fig. 6, although this figure is intended to illustrate the tube assembly at the commencement of the operation. It is found that the completed bellows tube may be ejected from the surrounding dies without injury by the form of tool shown in Fig. 11. This form of tool consists of a fork having two prongs 150 with a bearing rod 152 extending transversely above the lower ends of the prongs and designed to engage with the meeting edge of adjacent die plates with the prongs behind adjacent bellows folds and eject the bellows from the die plates without injury. This operation is indicated in dot-and-dash lines in Fig. 6.

Figure 3:
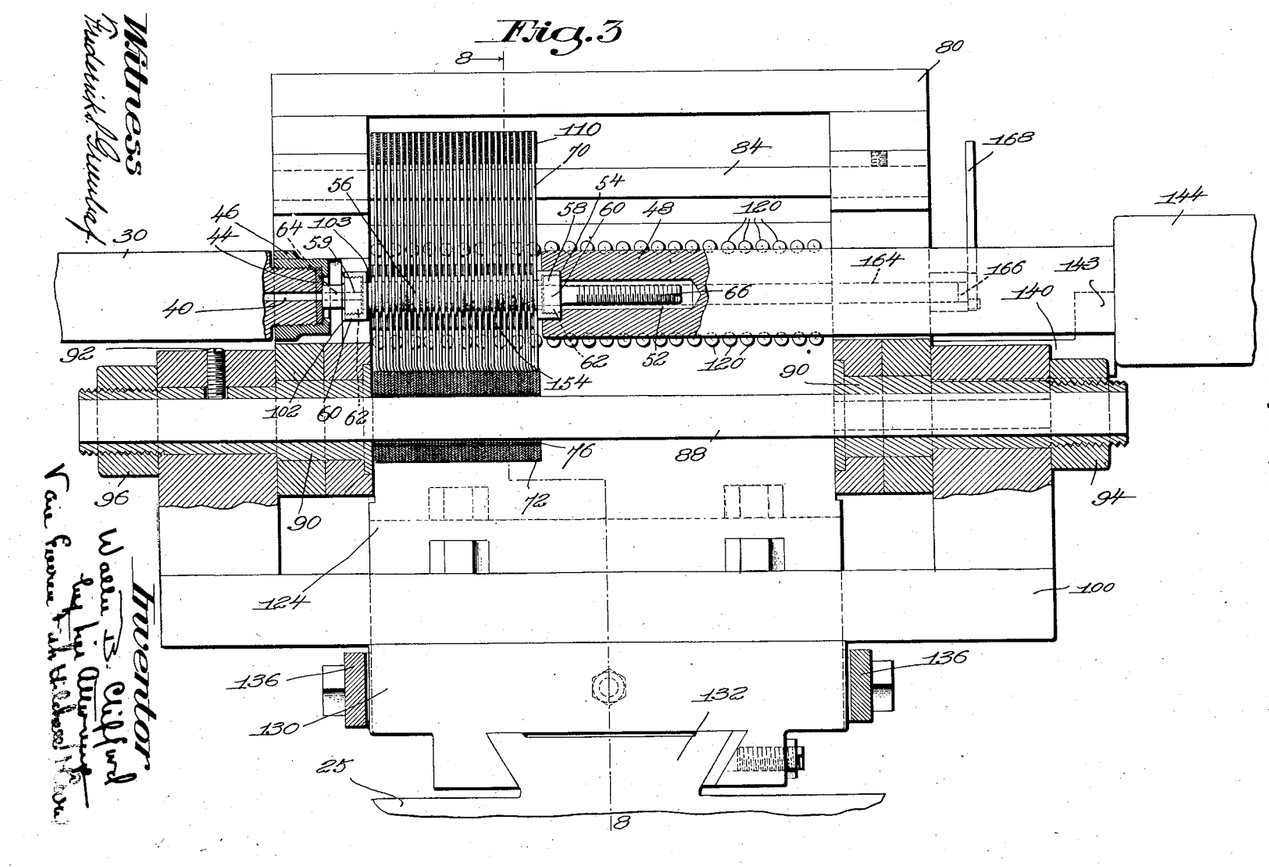
Fig. 3 is a view similar to Fig. 2 illustrating the forming mechanism at the completion of the forming operation.
Figure 4:
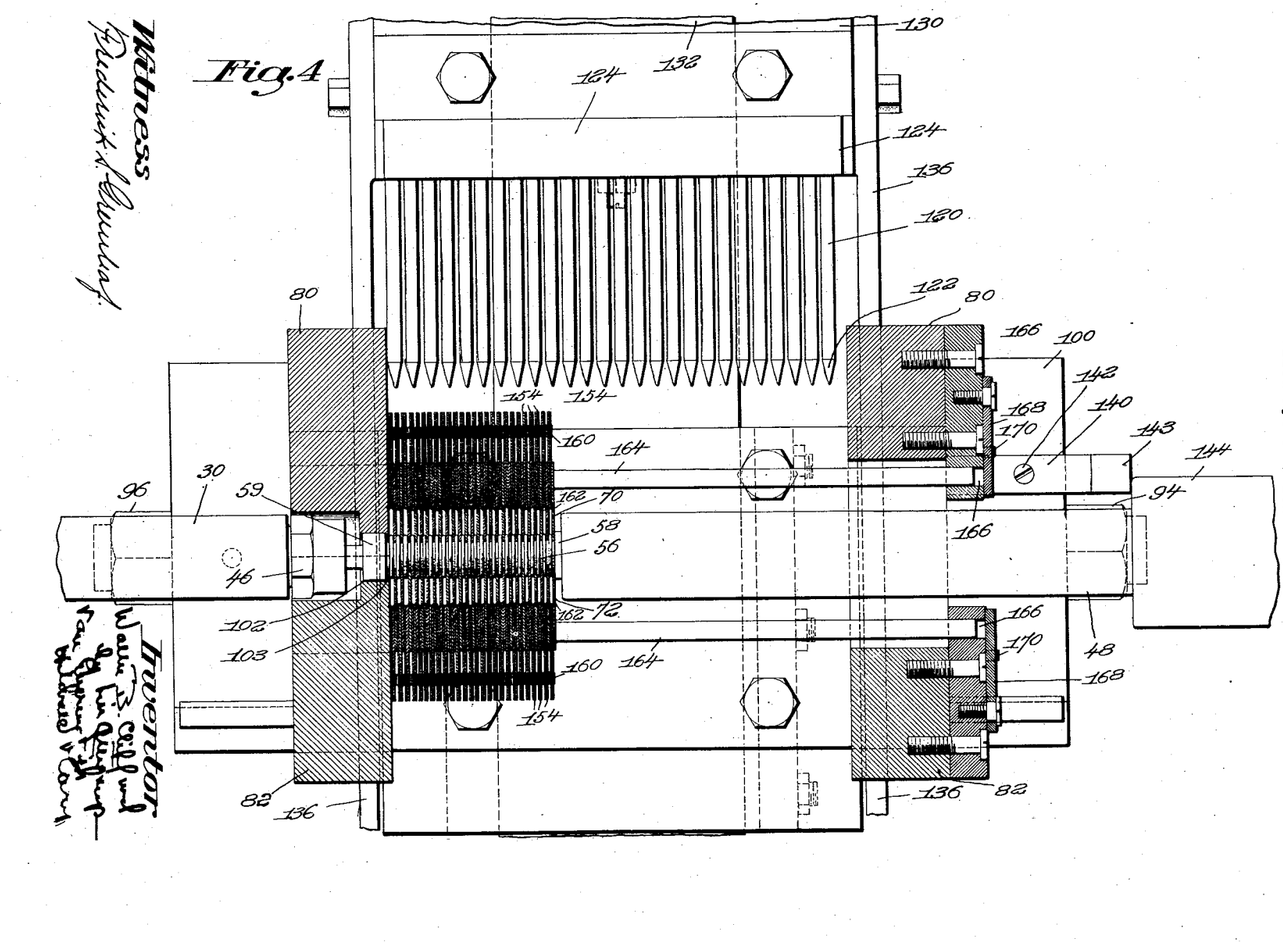
Fig. 4 is a plan view partially in section of the forming mechanism with the parts in the position shown in Fig. 3 and with the spacing members withdrawn from operative engagement with the dies.
Figure 9:
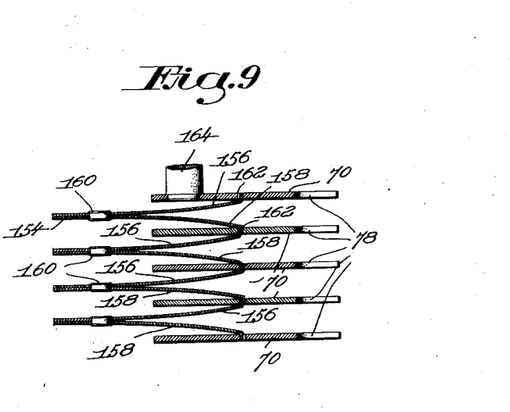
Fig. 9 is a section on the line 9—9 of Fig. 8 illustrating the individual die plates and the yielding spacer members.

It will be evident that the die plates traverse a substantial distance during the forming operation, as indicated more particularly by the difference in spacing in the plates in Figs. 2 and 3. In order to simplify the return of the die plates to initial position at the completion of the forming operation and the removal of the bellows assembly, a series of interconnected springs are positioned between each two sets of die plates. As indicated more particularly in Figs. 8 and 9, the halves of each two adjacent sets of die plates are normally separated by springs 154. Each of these spring assemblies comprises two opposed, bowed, flat springs 156 and 158 secured together at 160 and engaging at their free ends in slots 162 formed in the die plates. Each portion of the die plate is engaged by one end of the spring assembly, the two spring assemblies being positioned upon opposite sides of the tube assembly and substantially equi-distant therefrom. The springs are of such a thickness that the combined thickness of the two springs forming the assembly is approximately equal to the thickness of each of the die plates, so that upon the completion of the bellows the separation of the die plates is approximately equal to the thickness of the plates themselves. These springs not only tend to restore the die plates to initial separated position at the completion of the bellows, but in addition tend to aid in maintaining the parallelism of the die plates during the formation of the bellows and the traverse of the die plates from the position shown in Fig. 2 to that shown in Fig. 3. On the other hand the strength of the springs is only sufficient to return the relatively light die plates to initial position, and the springs do not interfere materially with the movement of the die plates toward one another during the formation of the bellows. In order to prevent a tendency to separation of the die plates upon withdrawal of the ram 48 and prior to the removal of the bellows, the complementary portion of each end die plate is provided with a rod 164 secured thereto, as shown in Fig. 9, and extending loosely through a recess 166 formed in the adjacent portion of the head, as shown in Fig. 4. As the die plates move toward one another during the formation of the bellows, the rods 164 are drawn through the passages 166 until upon the completion of the operation the ends of the rods are positioned substantially as shown in Fig. 4. At the start and during the formation of the bellows, pivoted dogs 168 are held up by the projecting ends of the rods 164. When the rods are drawn into the position shown in Fig. 4, however, the dogs are permitted to drop into the position shown in dotted lines in Fig. 8, resting upon pins 170. In this position the dogs close the ends of the passages 166, as indicated more particularly in Fig. 4, and prevent endwise movement of the rods 164 beyond that point. Thus, upon withdrawal of the heads engaging opposite ends of the tubular assembly and unlocking of the individual die members, there is a slight separation of the die members due to the interconnected springs. This slight separation is sufficient to relieve the pressure of the die members upon the interlocked bellows folds and permit the tubular assembly to be freely ejected without injury. If no means were provided for limiting the separation by action of the springs, the pressure of the die members would lock the bellows therebetween and greatly increase the difficulty of removal, if not make it impossible. Upon removal of the bellows and returning the dogs to initial position, shown in Fig. 5, the die members under the action of the interconnected springs are restored to the initial position shown in Fig. 2 ready for the insertion of a fresh tubular assembly. Thereafter the cycle of operations is repeated as desired.

It will be evident that with this construction the end fittings or heads are applied prior to the actual formation of the bellows and materially assist in expediting the formation of the bellows in the present apparatus. At the completion of the forming operation the assembly is completed without the necessity of performing additional operations, either soldering or otherwise mounting the end fittings in place. It will furthermore be evident that by removing the die assembly bodily from the bed of the machine and replacing it with a die assembly of a different character, bellows folds may be formed in tubing of varying diameter and length, the only limitation being the effective distance between the heads 28 and 29 and the distance available between the centers of the heads and the bed of the apparatus.

What is claimed is:

1. Apparatus for producing bellows tubing comprising a bed, a series of separable die plates slidingly supported upon the bed and having complementary openings for the reception of a tube therein, means for initially positively spacing the die plates, means for locking individual die plates about the tube lengthwise, means for contracting the tube, and means for preserving substantial parallelism of the die plates during the contraction of the tube while permitting a relatively free movement of the die plates with the tube.

2. Apparatus for producing bellows tubing comprising means for engaging opposite ends of a tube, a series of partable die plates encircling the tube at spaced intervals between the ends, means for rigidly locking individual die plates about the tube, removable means for positively spacing the plates, means for supporting the die plates for sliding movement toward and from one another lengthwise of the tube, and means for contracting the tube.

3. Apparatus for producing bellows tubing comprising a series of partable die plates encircling the tube at spaced intervals between its ends, a series of spacer members, means for moving the members into and out of operative position between the die plates, means for individually locking the die plates in closed position about the tube, means for slidingly supporting the die plates for relatively free movement toward and from one another, and means for contracting the tube.

4. Apparatus for producing bellows tubing comprising a series of partable die plates encircling a tube at spaced intervals, means for locking individual die plates rigidly about the tube, a partable head encircling a fitting at one end of the tube and having a portion engaging behind the fitting to rigidly support it, means engaging the end of the fitting and having an opening for the supply of fluid under pressure, a ram engaging the opposite end of the tube, and means for moving the ram to contract the tube in a lengthwise direction.

5. Apparatus for producing bellows tubing comprising a partable head having an inwardly extending flange engaging behind a fitting mounted on a tube, a fluid pressure head contacting with the fitting and having a fluid supply passage communicating with the passage formed in the fitting, and means for relatively moving the two members to seal the end of the fitting against the fluid pressure head.

6. Apparatus for producing bellows tubing comprising hinged ends, a series of hinged die plates interposed between the ends, a lower bearing rod connecting the hinged ends and slidably supporting the hinges of the die plates, a guide rod extending between each two sections of the hinged ends and slidably supporting the sections of the die plates.

7. Apparatus for producing bellows tubing comprising a partable hinged frame, each part consisting of two arms rigidly maintained in spaced relation and hinged at their inner ends, a series of separable die plates mounted within the frames, and connections between the die plates and the two parts of the frame to simultaneously move the parts of the die plates toward and from one another with the parts of the frame, while permitting independent sliding movement of the die plates toward and from one another within the frame.

8. Apparatus for producing bellows tubing comprising a bed, oppositely disposed heads supported by the bed and adapted to engage the ends of a tube between them, a support mounted on the bed between the heads, a two-part hinged frame on the support, and a series of two-part die plates carried by the frame and adapted to be opened and closed upon a tube by a movement of the two parts of the frame, the die plates being movable toward and from one another within the frame.

9. Apparatus for producing bellows tubing comprising a bed, oppositely disposed heads supported by the bed and adapted to engage the ends of a tube between them, a support mounted on the bed between the heads, a two-part hinged frame on the support, a series of two-part die plates carried by the frame and adapted to be opened and closed upon a tube by a movement of the two parts of the frame, the die plates being movable toward and from one another within the frame, and a series of spacer fingers movable into and out of operative position between the die plates.

10. Apparatus for producing bellows tubing comprising a longitudinal bearing, a series of partable die plates slidingly supported on the bearing, each consisting of two plates having complementary tube-encircling recesses formed therein, and a bushing pivotally connecting the die plates and slidingly supported on the bearing.

11. Apparatus for producing bellows tubing comprising a longitudinal bearing, a series of partable die plates slidingly supported on the bearing, each consisting of two plates having complementary tube-encircling recesses formed therein, a bushing pivotally connecting the die plates and slidingly supported on the bearing, and a locking latch designed to engage with the free ends of the die plates when in closed position and rigidly lock them together.

12. Apparatus for producing bellows tubing comprising a series of partable hinged die plates, guide members controlling the path of movement of the die plates toward and from one another, the guide members being adapted to engage with the die plates throughout areas of contact confined to their inner faces in order to preserve the alignment of the die plates during the movement toward and from one another while minimizing friction of the guides.

13. Apparatus for producing bellows tubing comprising a series of partable hinged die plates, the sections of each die plate having complementary recesses adapted to encircle the tube when the die plate is closed, and yielding means interposed between the die plates on opposite sides of the tube-encircling recesses to preserve substantial parallelism of the die plates while permitting independent movement toward and from one another.

14. Apparatus for producing bellows tubing comprising a series of partable hinged die plates, the sections of each die plate having complementary recesses adapted to encircle the tube when the die plate is closed, means interposed between the die plates on opposite sides of the tube-encircling recesses to preserve substantial parallelism of the die plates while permitting independent movement toward and from one another, and spacer fingers movable between the die plates on opposite sides of the tube-encircling recesses in uniform spaced relation with one another.

15. Apparatus for producing bellows tubing comprising a series of partable die plates adapted to surround a tube at spaced intervals between its ends, means for supporting the die plates for movement toward and from one another, means for yieldingly separating the die plates, means for supporting the tube at its ends, means for contracting the tube, and means for automatically preventing a substantial separation of the die plates upon completion of the tube contraction and withdrawal of the contracting means.

16. Apparatus for producing bellows tubing comprising a series of partable die plates having tube encircling recesses, means for supporting the die plates for movement toward and from one another, means for locking the individual die plates rigidly in position about the tube, and a series of flat springs interposed between adjacent die plates on opposite sides of the tube encircling recesses and designed to normally separate the die plates.

17. Apparatus for producing bellows tubing comprising a series of partable die plates, means for supporting the die plates for movement toward and from one another, means for locking the individual die plates rigidly in position about the tube, and two flat arched springs connected at one end and removably engaging with adjacent die plates at their free ends to normally separate the die plates while permitting a relatively free movement of the die plates toward one another.

18. Apparatus for producing bellows tubing comprising a series of partable die plates adapted to engage a tube at spaced intervals between its ends, means for locking individual die plates in closed position, means for supporting the die plates for movement toward one another, means for contracting the tube in an endwise direction to cause the die plates to move into close proximity, and an ejector member consisting of a plurality of separated fingers adapted to extend behind the tube between the die plates and an abutment engaging the edges of the die plates when parted to eject the completed tube from its position within the plates.

19. Apparatus for producing bellows tubing comprising a series of partable die plates adapted to engage a tube at spaced intervals between its ends, means for supporting the die plates to permit movement toward and from one another, a fluid pressure head engaging a fitting on one end of the tube, a contracting ram engaging with the opposite end of the tube, a liquid passage formed in the fluid pressure head, and means for yieldingly sealing the passage to the end fitting.

20. An apparatus for producing bellows tubing comprising a series of partable die plates normally freely movable toward and from one another, a series of spacer members for positively spacing the die plates, means for moving the spacer members transversely into and out of operative engagement with the die plates, means for applying fluid pressure internally of the tube, and means for contracting the tube lengthwise while maintaining the internal pressure.

21. An apparatus for producing bellows tubing comprising a series of partable die plates freely movable toward and from one another, means for maintaining the die plates in aligned relation during the movement of separation, means for initially positively maintaining the die plates in spaced relation, means for introducing fluid pressure internally of the tube, and means for contracting the tube lengthwise while maintaining the pressure.

22. Apparatus for producing bellows tubing comprising a bed, a fluid pressure head and opposed contracting ram on the bed, a die assembly removably mounted on the bed between the fluid pressure head and ram and having a series of partible sliding dies having complementary tube encircling recesses, means for moving the fluid pressure head and ram respectively into engagement with the opposite ends of a tube supported in the die assembly, and a series of spacer members removable from between the partible dies to permit contraction of the tube under the action of the ram.

23. Apparatus for producing bellows tubing comprising a fluid pressure head and opposed contracting ram, a die assembly mounted therebetween and having a series of partible die plates slidably mounted therein, means for moving the fluid pressure head into sealing engagement with an end fitting mounted upon the tube to be formed, and means engaging behind the extended portion of the end fitting and adapted to positively resist the thrust exerted by the fluid pressure head thereon.

24. Apparatus for producing bellows tubing comprising a series of partible die plates adapted to surround a tube at spaced intervals, means for introducing fluid pressure within a tube encircled by the die plates, means for contracting the tube so encircled with fluid pressure therein, means for normally maintaining the die plates in a separated position adapted to permit movement of the die plates toward one another upon contraction of the tube, and means for automatically preventing substantial separation of the die plates at completion of the bellows folds and upon withdrawal of the contracting means.

25. Apparatus for producing bellows tubing comprising a series of partible die plates, means for normally maintaining the die plates in a spaced relationship, means for individually locking the die plates about a tube, means for contracting the tub while so encircled by the die plates, a slide rod connected with an end die plate and movable therewith during the contraction of the tube, and a locking latch designed to engage the rod and limit reverse movement upon withdrawal of the contracting means at the completion of the contracting movement.

26. Apparatus for producing bellows tubing comprising a bed, a fluid pressure head and contracting ram opposed to one another on the bed, a die assembly having a series of partible dies mounted on the bed therebetween, means for moving the fluid pressure head and the ram in opposite directions to engage the ends of the tube mounted in the die assembly, a transversely movable slide, and a series of spacer members mounted on the slide and designed to be moved into and out of operative engagement between the partible die plates when the plates are in spaced relation.

27. Apparatus for producing bellows tubing comprising a series of partible dies having complementary tube encircling recesses, means for rigidly locking individual dies in closed position, a slide, a series of uniformly disposed spacer members mounted upon the slide and designed to be introduced between adjacent partible dies to maintain the dies in uniform spaced relation, and means for moving the slide transversely of the partible dies to move the spacer members into and out of operative relation thereto.

28. Apparatus for producing bellows tubing comprising a series of partible dies having complementary tube encircling recesses, means for locking the dies about a tube to be formed, spacer members for maintaining the dies in an initial spaced relation, members engaging opposite ends of the tube, means for introducing fluid pressure into the tube through one of the members, means for thereafter removing the spacer members from between the dies, means for securing a relative movement of the end members to contract the tube and encircling dies after the removal of the spacer members, and means for returning the dies to approximately initial position at the completion of the operation and subsequent separation of the end members.

WALTER B. CLIFFORD.

DISCLAIMER 1,689,620.—*Walter B. Clifford*, Framingham, Mass. APPARATUS FOR PRODUCING BELLOWS FOLDS IN TUBING. Patent dated October 30, 1928. Disclaimer filed March 5, 1936, by the assignee, *Clifford Manufacturing Co.*

Hereby enters this disclaimer to claim 13 of said patent.

[*Official Gazette March 31, 1936.*]